(12) United States Patent
Pettersen et al.

(10) Patent No.: US 11,043,793 B2
(45) Date of Patent: *Jun. 22, 2021

(54) BRIDGE JOINT COVER ASSEMBLY

(71) Applicant: EATON INTELLIGENT POWER LIMITED, Dublin (IE)

(72) Inventors: Gordon Stanley Pettersen, Greenwood, SC (US); Michael Anthony Wynnik, Pelzer, SC (US); Ben Schermerhorn, Greenwood, SC (US)

(73) Assignee: Eaton Intelligent Power Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 16/899,957

(22) Filed: Jun. 12, 2020

(65) Prior Publication Data
US 2020/0313408 A1 Oct. 1, 2020

Related U.S. Application Data

(63) Continuation of application No. 16/509,611, filed on Jul. 12, 2019, now Pat. No. 10,686,305, which is a continuation of application No. 15/643,983, filed on Jul. 7, 2017, now Pat. No. 10,355,462.

(60) Provisional application No. 62/456,849, filed on Feb. 9, 2017.

(51) Int. Cl.
*H02G 3/04* (2006.01)
*G01J 5/10* (2006.01)
*H02G 5/00* (2006.01)
*H02B 3/00* (2006.01)
*H01H 9/02* (2006.01)

(52) U.S. Cl.
CPC .............. *H02G 3/0418* (2013.01); *G01J 5/10* (2013.01); *H02G 5/00* (2013.01); *H02G 5/007* (2013.01); *H01H 2009/0292* (2013.01); *H02B 3/00* (2013.01)

(58) Field of Classification Search
CPC ............ H02H 3/04; H02H 5/00; H02H 5/025; H02H 5/04; H02H 5/066; H02H 5/007; H02H 3/0418; G01J 5/10; H02B 1/21; H02B 1/20; H01H 2009/0292; H01H 9/02; H02G 3/04; H02G 5/00; H02G 5/025; H02G 5/04; H02G 5/066; H02G 5/007; H02G 3/0418
USPC ............ 174/66, 67, 70 B, 68.1, 68.2, 149 B, 174/72 B; 361/611, 648, 679.01
See application file for complete search history.

(56) References Cited

U.S. PATENT DOCUMENTS

| | | | | |
|---|---|---|---|---|
| 4,678,253 A * | 7/1987 | Hicks, Jr. | ................. | H02G 5/06 174/68.2 |
| 5,466,889 A * | 11/1995 | Faulkner | ................ | H02G 5/007 174/133 B |
| 5,760,339 A * | 6/1998 | Faulkner | .............. | H01R 25/162 174/88 B |
| 5,785,542 A * | 7/1998 | Johnson | ............... | H01R 25/162 439/210 |
| 10,355,462 B2 * | 7/2019 | Pettersen | ................. | H02G 5/00 |
| 10,686,305 B2 * | 6/2020 | Pettersen | ............. | H02G 3/0418 |

* cited by examiner

*Primary Examiner* — Angel R Estrada
(74) *Attorney, Agent, or Firm* — Squire Patton Boggs US LLP

(57) ABSTRACT

A bridge joint cover assembly for a busway bridge joint, the assembly comprising at least one cover plate having an opening and a viewing plate including infrared (IR) material. The IR material is aligned with the opening of the cover plate.

20 Claims, 7 Drawing Sheets

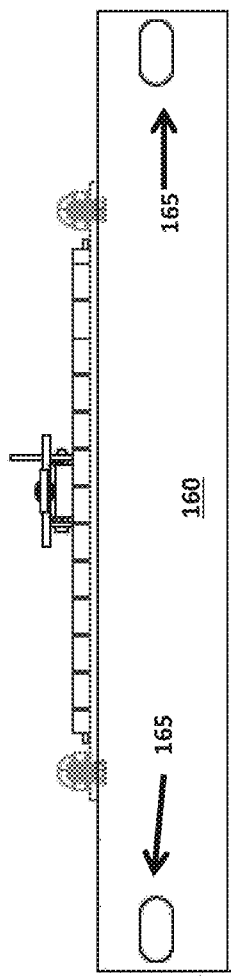

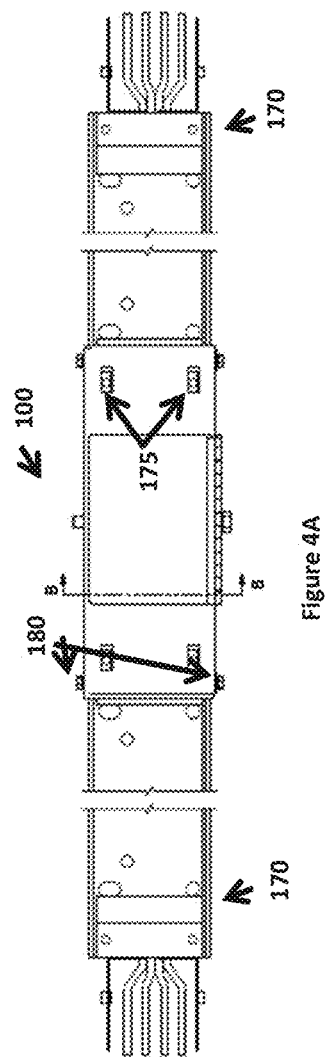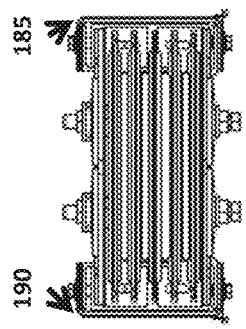

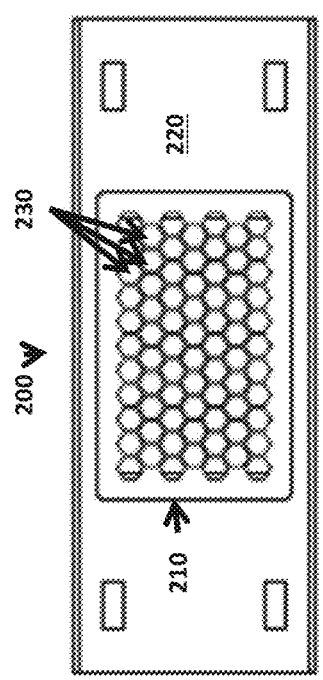

BRIDGE JOINT COVER ASSEMBLY

CROSS-REFERENCE TO RELATED APPLICATION

This application is a continuation of U.S. patent application Ser. No. 16/509,611, filed on Jul. 12, 2019, which in turn is a continuation of U.S. patent application Ser. No. 15/643,983, filed on Jul. 7, 2017 (now U.S. Pat. No. 10,355,462 issued Jul. 16, 2019), which in turn claims the benefit of U.S. Provisional Patent Application No. 62/456,849, filed on Feb. 9, 2017. The disclosures of these applications are incorporated by reference herein in their entirety.

FIELD OF INVENTION

The present disclosure relates to windows for exposing connection lines of a busway bridge joint. More specifically, the present disclosure relates to windows for exposing the electrical connections of a busway bridge joint for measuring a live temperature of the connections.

BACKGROUND

Busway installations consist of several pieces of bus duct that are connected with bridge joints. Bridge joints transfer the electrical load from one busway piece to the next via conductor plates and insulator plates. The joint may be assembled via a bolted joint connection, ensuring that the proper contact is maintained between phases of each busway piece.

Bridge joint covers are installed around the bridge joints to prevent injury to people nearby, as well as to comply with safety standards set by various standards-setting organizations and governments. To comply with general best practices, infrared ("IR") temperature measurements of certain portions of busways must be made periodically.

Bridge joint covers may be made of continuous metal, preventing a user from easily inspecting a bridge joint or making temperature measurements. Thus, a user must first power down an entire busway, remove the cover, and power the busway back on before making the temperature measurement of the live busway. This method is cumbersome, inefficient, and dangerous due to the live busway being exposed. "Live" in this context means a condition where electricity is actively flowing through the phases of the busways and bridge joint.

SUMMARY

A bridge joint cover plate assembly includes a bridge joint cover plate having a cover plate hole, a viewing plate fixed to the bridge joint cover plate, wherein the viewing plate covers the cover plate hole, and infrared (IR) material located on the viewing plate. The IR material is aligned with the cover plate hole. The IR material may further comprise at least one port. The viewing plate may further include an IR material cover connected to the viewing plate. The IR material cover may further include a fastening assembly at an upper portion of the IR material cover, configured to selectively lock the upper portion of the IR material cover to the viewing plate. The IR material may be a plurality of honeycomb-shaped ports. The viewing plate may be connected to the bridge joint cover plate via one or more bolts, or alternatively may be connected to the bridge joint cover plate via welding, or alternatively may be integral with the bridge joint cover plate. The bridge joint cover plate may include two horizontally extending flanges to fix the bridge joint cover plate to the at least one busway. The assembly may further include a top plate and a bottom plate that attach to the bridge joint cover plate, to cover a top and a bottom of a bridge joint. The bridge joint cover plate may further include at least one elongated hole configured to receive a bolt.

In another embodiment, a method for reading temperatures on a busway comprises the steps of opening an IR material cover on a viewing plate to expose IR material of the viewing plate, wherein at least a portion of a busway is visible though the IR material of the viewing plate, and measuring the temperature on at least a portion of the busway, while the busway is live. The step of measuring may be performed with a non-contact temperature gun. The measurement may be taken through the IR material of the viewing plate. The IR material cover may be attached to the viewing plate. The IR material may comprise a plurality of honeycomb-shaped ports.

In yet another embodiment, a bridge joint cover assembly includes a bridge joint cover plate, where the bridge joint cover plate includes a cover plate hole. The bridge joint cover assembly also includes a viewing plate fixed to the bridge joint cover plate and covering the cover plate hole. At least a portion of the viewing plate is constructed of infrared material. The bridge joint cover assembly further includes a cover connected to the viewing plate.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 3 is a bottom view of the cover plate shown in FIG. 1;

FIG. 4A is a front view of the cover plate of FIG. 1, installed over a bridge joint connecting two busways;

FIG. 4B is a section view of FIG. 4A along line B-B;

FIG. 5 is a front view of another embodiment of a cover plate and viewing plate, omitting an IR material cover;

DETAILED DESCRIPTION

Figure 1:
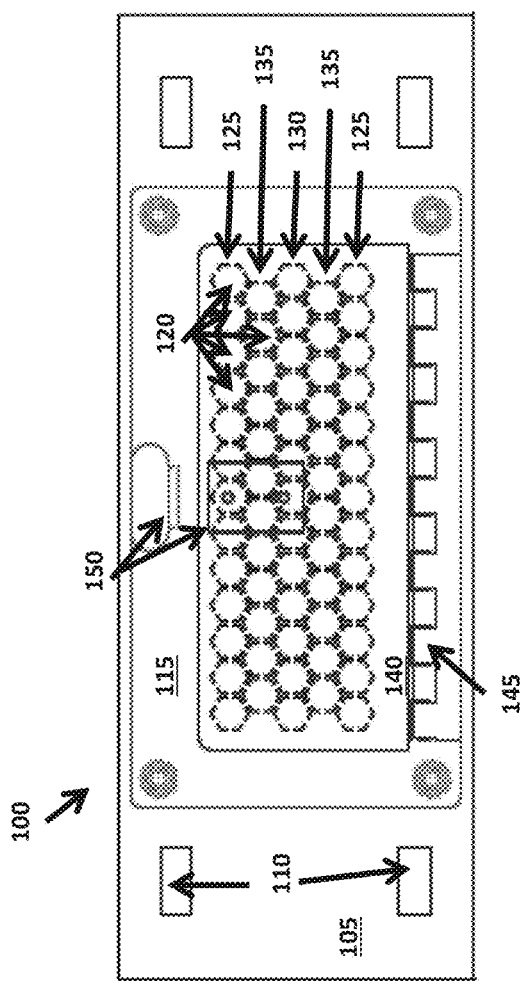
FIG. 1 is a front view of one embodiment of a cover plate having a viewing plate with ports shown in dashed lines.

FIG. 1 shows a front view of a bridge joint cover assembly 100 according to one embodiment of the present disclosure. Bridge joint cover assembly 100 covers a bridge joint connecting two busways in an electrical distribution system. Each busway can have single or multiple phases providing power, and the bridge joint serves to connect the respective phases on each busway. The bridge joint cover assembly 100 is a two piece assembly, with the front piece being shown in FIG. 1.

The bridge joint cover assembly 100 includes a bridge joint cover plate (also referred to as "cover plate") 105 having four rectangular slots 110 located at the corners of the cover plate 105. Rectangular slots 110 allow the bridge joint cover assembly 100 to be affixed to the busways and/or bridge joint via bolts extending through the rectangular slots 110 and corresponding holes in the busways and/or bridge joint. Rectangular slots 110 allow for adjustability in the right-left directions when mounting the bridge joint cover assembly 100 to busways. In alternative embodiments (not shown), any other number of slots may be used, such as two or five slots. In other alternative embodiments (not shown), other apertures may be employed, such as circular, square, arcuate-shaped, or irregular-shaped. Each aperture need not have the same shape. For example, circular apertures may be employed on a left side while rectangular slots are employed on a right side.

A viewing plate 115 is mounted to the cover plate 105 with bolts located at each corner of the viewing plate 115. Bolts extend through both the viewing plate 115 and cover plate 105 to affix the viewing plate 115 to the cover plate 105. In alternative embodiments (not shown), the viewing plate can be fixed to the cover plate via other mechanical fastening means such as by screw or rivet, welding, chemical bonding, or by any other temporary or permanent attachment method.

Viewing plate 115 in this embodiment includes a plurality of transparent honeycomb-shaped ports 120, shown in dashed lines in FIG. 1. The honeycomb-shaped ports 120 are made from an IR material, which is any material having physical properties suitable for obtaining a temperature reading therethrough. IR material can include, for example, a transparent glass, AMTIR-1 (amorphous material transmitting infrared radiation), arsenic trisulfide, barium fluoride, cadmium telluride, calcium fluoride, fused silica, germanium, IR polymers, lead fluoride, lithium fluoride, magnesium fluoride, magnesium oxide, sapphire, sodium chloride, silicon, thallium bromo-iodide, zinc, selenide, or zinc sulfide. The remainder of viewing plate 115 in this embodiment is made of a metal material, such as steel or an alloy. Ports 120 are arranged in five adjacent rows in FIG. 1, with the two outer rows 125 and central row 130 having one additional port than the two intermediate rows 135. Cover plate 105 further includes a cover plate hole located in a central location of cover plate 105, aligned with the ports 120. In alternative embodiments (not shown), the number and arrangement of ports can vary. In other alternative embodiments (not shown), a single pane of IR material may be used instead of ports 120. In still other alternative embodiments (not shown), the viewing plate 115 can be made of a different material, such as a polymeric material for example. In alternative embodiments (not shown) ports can take other shapes, such as a circular shape, a rectangular shape, or an irregular shape.

Viewing plate 115 further includes an IR material cover 140, which is connected to viewing plate 115 via a hinge 145. IR material cover 140 can be selectively opened or closed to reveal the plurality of ports 120. IR material cover 140 is a flat solid piece of steel or other metal material. Latch mechanism 150 selectively latches the top of IR material cover 140 to viewing plate 115, to permit the IR material cover 140 to open and close. In alternative embodiments (not shown), other fastening means suitable for opening and closing the IR material cover 140 may be used instead of latch mechanism 150, for example a sliding cover, a rotatable cover, or a removable cover. In alternative embodiments (not shown), the IR material cover, hinge, and latch mechanism can be omitted.

When a user opens IR material cover 140 by releasing latch mechanism 150, the user can measure the temperature of each phase in the busways, or regions of the busways or bridge joint, through one of the plurality of ports 120 by using a non-contact infrared temperature gun (not shown). The user may also inspect the busway and bridge joint visually through the ports 120. The user may make these measurements while the busway is live and conducting electricity. With the IR material cover open, a user can also visually observe the busways and connection points at a bridge connecting two busways. With this arrangement, a user does not have to power down the busways and remove the bridge joint cover prior to observing the busways or taking temperature measurements.

The bride joint cover assembly 100 further provides a grounding path for power running through the busway and across the bridge joint. When the cover is assembled onto the bridge joint it is affixed to the busway bus duct with bolts, as described above. The bus duct contains an end block that is grounded and rated to carry the ground current. The bridge joint cover assembly is clamped to the bus duct, which provides an electrical path to the end block, providing the needed surface area to maintain a proper ground path.

Figure 2:
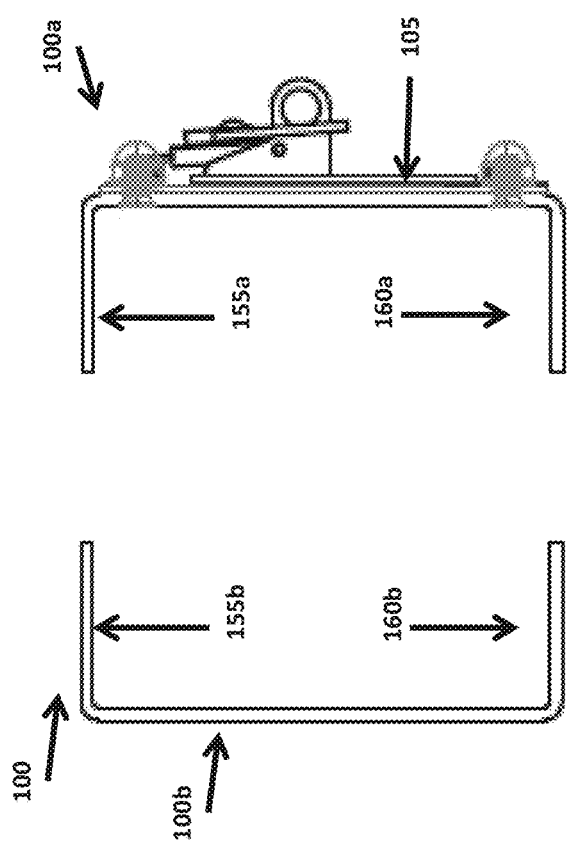
FIG. 2 is a side view of the cover plate shown in FIG. 1.

FIG. 2 shows a side view of a front piece 100a of bridge joint cover assembly 100. At the top and bottom of the bridge joint cover assembly front piece are two horizontal flanges 155a and 160a extending at a right angle from cover plate 105. Flanges 155a and 160a extend around a top and bottom of busways and the bridge joint when installed. A back piece 100b of bridge joint cover assembly also has two horizontal flanges 155b, 160b, and is oriented opposite the front piece 100a when installed. The back piece 100b of bridge joint cover is installed to the bridge joint and busways in the same way as the front piece of bridge joint cover. When a back piece 100b of bridge joint cover assembly is installed with the front piece 100a, the busways and bridge joint are partially enclosed from the environment by flanges 155a, 155b, 160a, and 160b. In this embodiment, the top and bottom of the bridge joint will be partially exposed when front and back pieces are installed, and the top and bottom of the bridge joint will not covered by the flanges. In alternative embodiments (not shown), the flanges on the front and back pieces can connect to each other to enclose the entire bridge joint, such that no part of the bridge joint is exposed.

The back piece of FIG. 2 does not include the viewing plate, ports, and IR material cover. In alternative embodiments (not shown), the back piece can also have a viewing plate with ports and an IR material cover, similar to the front piece shown in FIG. 2. In other alternative embodiments (not shown), the back piece may have some but not all of a viewing plate, ports, or IR material cover.

FIG. 3 illustrates a bottom side of the front piece of bridge joint cover assembly 100, showing two elongated holes 165 at the edges of flange 160. Elongated holes 165 align with corresponding holes in the busways and/or bridge joint (not shown), and allow the bridge joint cover assembly 100 to be secured to the same with bolts. Elongated holes 165 allow the bridge joint cover assembly 100 to be affixed to the busways and/or bridge joint. Elongated holes 165 allow for adjustability in the right-left direction when mounting the bridge joint cover assembly 100 to busways. In alternative embodiments (not shown), any other number of elongated holes may be used, such as one or three holes. In other alternative embodiments (not shown), other apertures may be employed, such as circular, rectangular, arcuate-shaped, or an irregular-shaped. Each aperture need not have the same shape. For example, a circular aperture may be employed on a left side while a rectangular hole is employed on a right side.

FIG. 4A is a front view of bridge joint cover assembly 100 installed on two adjacent busways 170, and covering a bridge joint (not shown). Busways 170 shown in FIG. 4A are exemplary, and presented only for illustrative purposes. While busways 170 are depicted as having four lines, other busways having any number of lines may alternatively be used with the bridge joint cover of the present disclosure. Bolts 175, 180 secure the bridge joint cover assembly via slots 110 and holes 165, respectively.

FIG. 4B illustrates a section view of installed bridge joint cover assembly 100 along line B-B of FIG. 4A. As seen in FIG. 4B, the bridge joint cover assembly 100 includes both a front piece 185 and a back piece 190, which substantially cover the front and back of the busway components.

FIG. 5 illustrates an alternative embodiment of a bridge joint cover assembly 200. The bridge joint cover 200 is substantially the same as the bridge joint cover 100 described above, except for the differences described herein. The bridge joint cover assembly 200 includes a viewing plate 210 welded to mounting plate 220. In this embodiment, there is no IR material cover. Viewing plate 210 includes a plurality of infrared ("IR") ports 230, similar to the IR ports 120 of FIG. 1. In alternative embodiments (not shown), ports may be integrated with a mounting plate, eliminating viewing plate. In other alternative embodiments (not shown), a single pane of transparent IR material may be used in place of IR ports 230.

Figure 6:
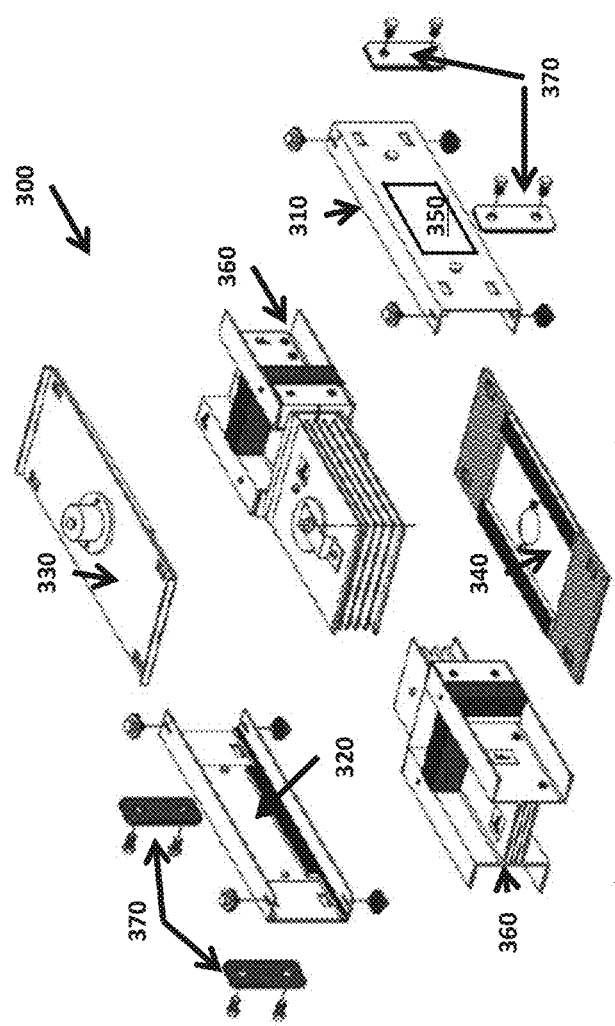
FIG. 6 is an exploded isometric view of an embodiment of a bridge joint cover assembly having four main pieces.

FIG. 6 illustrates an exploded view of another alternative embodiment of a bridge joint cover assembly 300, for use in an outdoor environment. Bridge joint cover assembly 300 is substantially the same as the prior embodiments, except for the differences described below. Bridge joint cover assembly 300 has four pieces, including a front piece 310, a back piece 320, a top piece 330, and a bottom piece 340. Pieces 310, 320, 330, 340, are fastened together via the various bolts extending through slots in each of the pieces, as shown in FIG. 6. The slots of the various pieces are aligned with corresponding slots in the busway and bridge joint, so that when bolts are inserted through the aligned slots the pieces of the bridge joint cover assembly 300 are fixed to the busways and bridge joint.

Top piece 330 and bottom piece 340 provide weatherproofing to the bridge joint, and allow the bridge joint to operate in an environment exposed to the elements. Smaller waterproof plates 370 are installed on the outside of the front piece 310 and back piece 320 to seal the slots in order to waterproof the bridge joint.

In alternative embodiments (not shown), the bridge joint cover assembly 300 can be fastened together with other fastening means, such as by welding. Viewing plate 350 is not shown in detail, but is similar to the viewing plates discussed in the other embodiments of the present disclosure. Busways 360 include four phases, as described above, but are merely exemplary. In alternative embodiments (not shown), busways may include greater or fewer than four phases, for example three phases or 5 phases. This embodiment does not include a cover plate for viewing plate 350, but one can be included in alternative embodiments.

Figure 7:
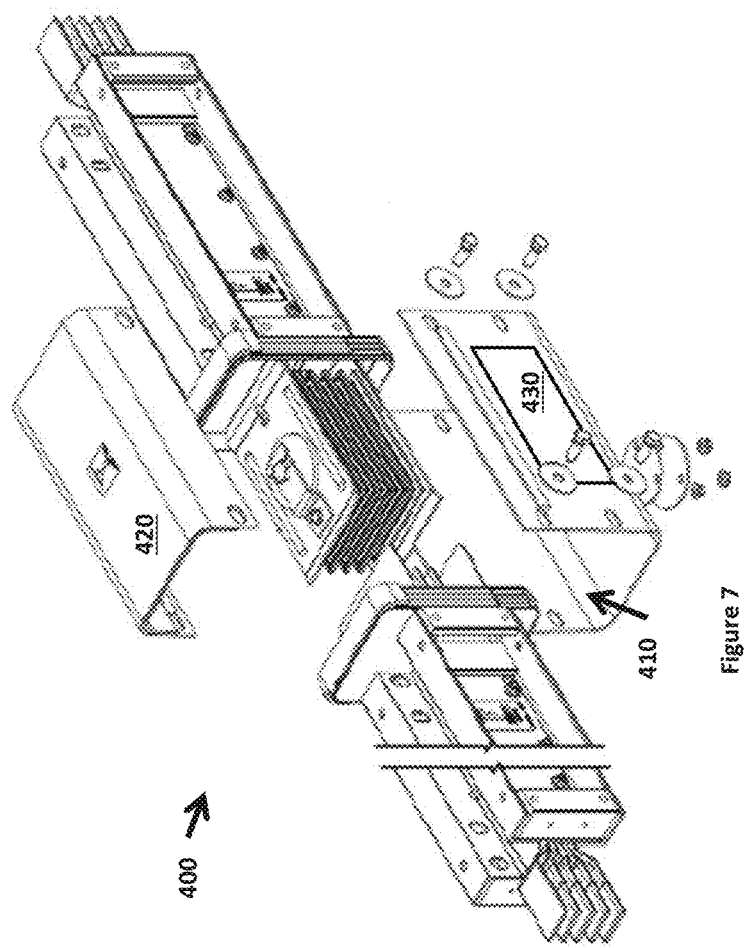
FIG. 7 is an exploded isometric view of a bridge joint cover assembly having two U-shaped pieces.

FIG. 7 illustrates an exploded view of an alternative embodiment of a bridge joint cover assembly 400, which is substantially the same as the embodiments disclosed above, except for differences detailed below. Bridge joint cover assembly 400 has two pieces, including a U-shaped lower piece 410 and a U-shaped upper piece 420 that are designed to connect to each other. Lower piece 410 includes viewing plate 430, which is not shown in detail but is similar to the viewing plates discussed in the other embodiments of the present disclosure. This embodiment omits a cover plate, but a cover plate can be included in alternative embodiments (not shown). Similar to the embodiment disclosed above, the bridge joint cover assembly 400 can be fastened to a bridge joint and/or busways via a plurality of bolts. Similar to the embodiment of FIG. 6, the slots of the various pieces are aligned with corresponding slots in the busway and bridge joint, so that when bolts are inserted through the aligned slots the pieces of the bridge joint cover assembly 400 are fixed to the busways and bridge joint. The busways shown in FIG. 7 are merely exemplary, and other busways may be used without departing from the scope of the present disclosure.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A bridge joint cover assembly comprising:
   a bridge joint cover plate configured to extend between a pair of busways and to cover a bridge joint, wherein the bridge joint cover plate includes at least one first opening; and
   a viewing plate fixed to the bridge joint cover plate, wherein the viewing plate includes at least one second opening aligned with the at least one first opening; and
   infrared (IR) material located between the bridge joint cover plate and the viewing plate, wherein the IR material has physical properties suitable for obtaining a temperature reading therethrough.

2. The bridge joint cover assembly of claim 1, further comprising a hinged cover configured to selectively cover the viewing plate.

3. The bridge joint cover assembly of claim 2, further comprising a latch mechanism connected to the hinged cover.

4. The bridge joint cover assembly of claim 1, further comprising a rotatable cover configured to selectively cover the viewing plate.

5. The bridge joint cover assembly of claim 1, further comprising a sliding cover configured to selectively cover the viewing plate.

6. The bridge joint cover assembly of claim 1, further comprising a removable cover configured to selectively cover the viewing plate.

7. The bridge joint cover assembly of claim 1, wherein the bridge joint cover plate includes two flanges that extend to fix the bridge joint cover plate to at least one busway.

8. The bridge joint cover assembly of claim 1, further including a top plate and a bottom plate that attach to the bridge joint cover plate, to cover a top and a bottom of a bridge joint.

9. The bridge joint cover assembly of claim 1, further including a waterproof seal.

10. The bridge joint cover assembly of claim 1, wherein the bridge joint cover plate further includes at least one elongated hole configured to receive a bolt.

11. The bridge joint cover assembly of claim 1, further including a waterproof seal.

12. A bridge joint cover assembly comprising:
a plate configured to extend between a pair of busways and to cover a bridge joint, wherein the plate includes an opening; and
infrared (IR) material located in the opening, wherein the IR material has physical properties suitable for obtaining a temperature reading therethrough.

13. The method of claim 12, further comprising a cover attached to one of the plate and the bridge joint.

14. The method of claim 12, wherein the opening in the plate includes a plurality of openings.

15. The method of claim 14, wherein the plurality of openings are a plurality of honeycomb-shaped ports.

16. A bridge joint cover assembly comprising:
a first plate configured to extend between a pair of busways and to cover a bridge joint, wherein the first plate includes a hole;
an IR material having physical properties suitable for obtaining a temperature reading therethrough; and
a second plate covering the IR material.

17. The bridge joint cover assembly of claim 16, wherein the second plate is a cover connected to the bridge joint.

18. The bridge joint cover assembly of claim 17, wherein the IR material is located in the hole in the first plate.

19. The bridge joint cover assembly of claim 16, wherein the second plate includes a hole corresponding to the hole of the first plate.

20. The bridge joint cover assembly of claim 19, wherein the IR material is sandwiched between the first plate and the second plate.

\* \* \* \* \*